Oct. 21, 1941.                E. SCHIEBOLD                2,259,708
                        TESTING MATERIALS BY X-RAY
                        Filed March 9, 1939          4 Sheets-Sheet 2
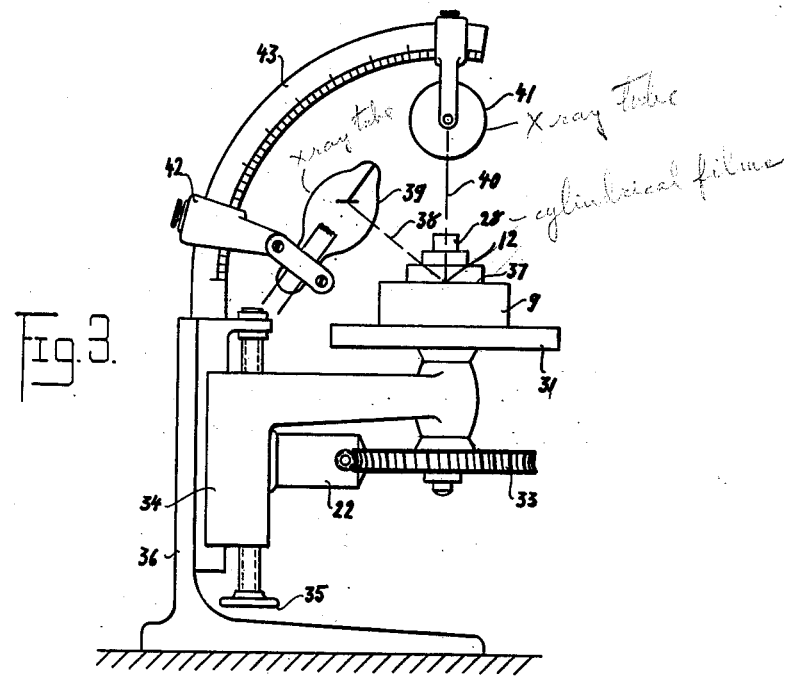
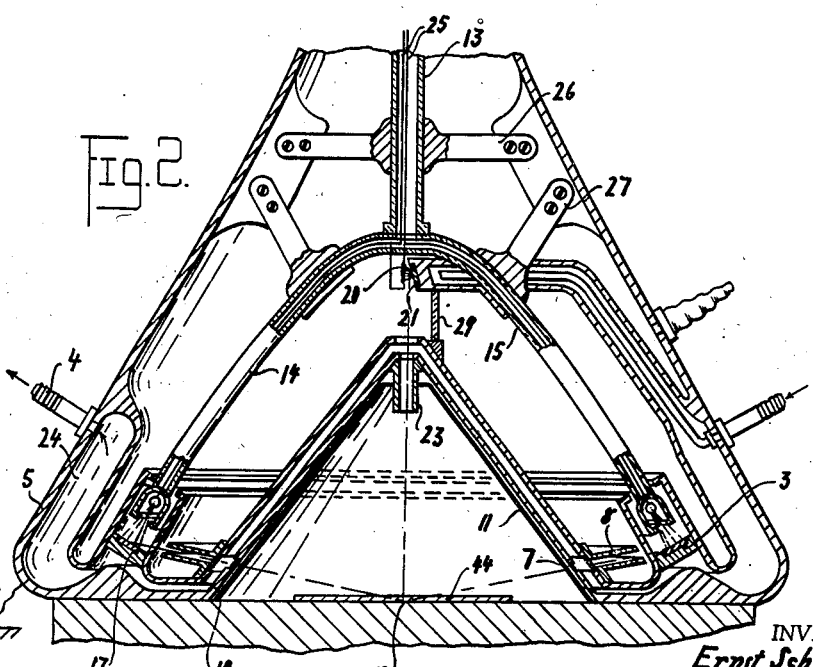
INVENTOR.
Ernst Schiebold.
BY
his ATTORNEY.

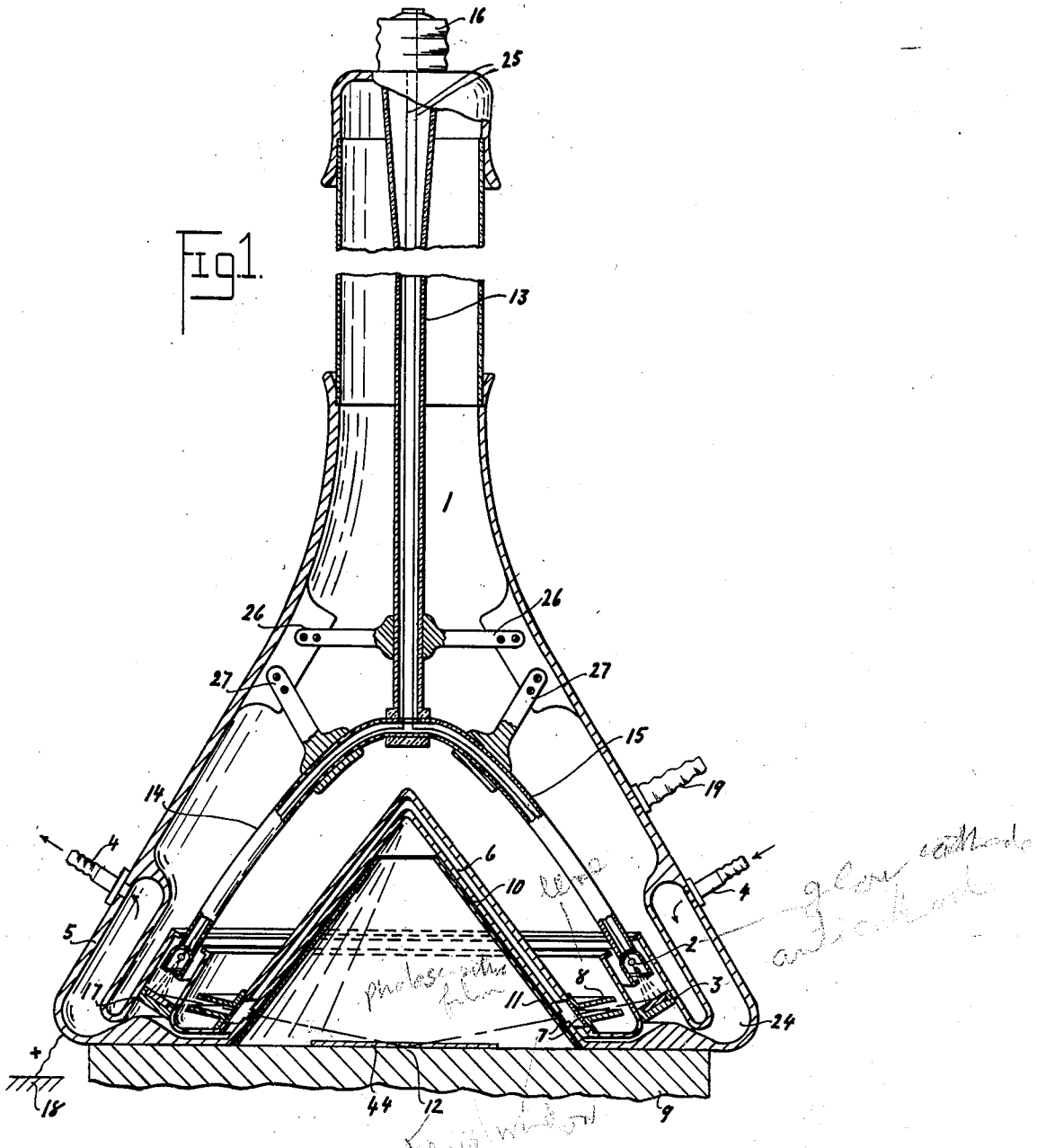

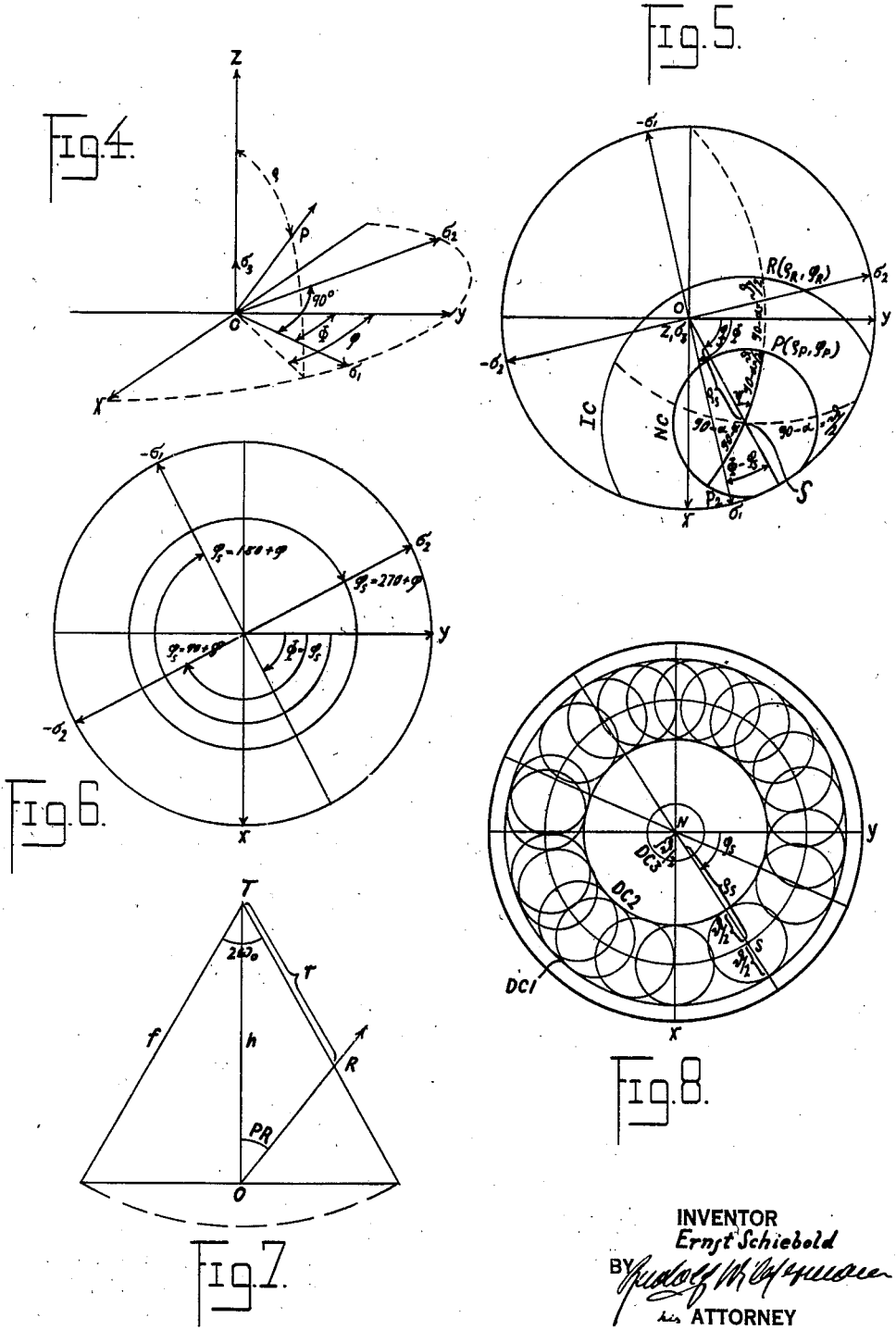

Oct. 21, 1941.　　　E. SCHIEBOLD　　　2,259,708
TESTING MATERIALS BY X-RAY
Filed March 9, 1939　　　4 Sheets-Sheet 4

INVENTOR
Ernst Schiebold
BY
ATTORNEY

Patented Oct. 21, 1941

2,259,708

UNITED STATES PATENT OFFICE 2,259,708

TESTING MATERIALS BY X-RAY

Ernst Schiebold, Leipzig, Germany

Application March 9, 1939, Serial No. 260,818
In Germany June 14, 1937

13 Claims. (Cl. 250—53)

This invention concerns a method of and an apparatus for testing fabricated and raw materials by means of X-rays.

This invention has the principal object of improving upon apparatus used for and the method of determining the interior structure, forces and stresses of materials. Measurements of the delicate crystalline structure of materials have gained increased import and the research in testing of and improvement on materials before and after they are technically applied.

This invention is to facilitate and expedite the testing by X-rays and also to yield accurate and unequivocal information, where prior measurements and apparatus merely yielded general indications.

In the procedures heretofore followed in the tests of this kind, the so-called Debye-Scherrer method occupied a prominent position, since it is particularly adapted for the analysis of materials of delicate crystalline structure. In that method a pencil of accurately circumscribed mono-chromatic primary rays strikes a sample of material and produces rays of interference, which, in connection with any particular material, extend at a fixed angle, may at times also extend back, and may be intercepted and registered upon or by way of photo-sensitive means, such as a photographic film. By the use of suitable lens means a pencil of primary rays which are as parallel with each other as possible, or which show very little divergence, are selected from the radiation emanating from the focus of an X-ray tube at more or less of a point source. That may perhaps also be accomplished by using a suitably shaped anti-cathode. More strongly diverging rays may be used by bringing the samples of material to be tested so close to the point of issuance of the rays, that all rays leaving the window of the tube strike the crystal in plane fashion—which may be termed large angle irradiation.

When a crystal lattice is elastically deformed, a change of distance of the lattice plane levels is effected, and is noticed by way of a displacement, or in part also a widening, of the X-ray lines of interference in a Debye-Scherrer diagram of redirected rays.

When use is made of monochromatic rays normal to the surface of the material to be tested, the reflected ray is inclined as little as possible relatively to a direction normal to the surface; i. e. it is primarily caused by planes of the polycrystalline material, which are substantially parallel to the surface thereof. Nevertheless this method—even in the manner in which it has been further developed—only permits evaluation of the sum of the principal forces of tension in the irradiated area of the surface of the material to be tested, but does not permit a determination of each of said principal forces. The practical applicability of this method is therefore only an extremely limited one.

In order to facilitate a separate determination of the direction as well as the size of the principal forces occurring primarily in the surface of the material to be tested, other investigators prepared several X-ray exposures, preferably four in number. They consisted of an exposure in a normal direction and of three "inclined" exposures at a fixed azimuth, in order to render unnecessary a separate determination of the constants of the lattice in untensioned state, and thus to eliminate an important source of mistakes. This resulted in a complete evaluation of the state of tension in an observed area of the surface. Since each of the X-ray exposures consumes a period of ½ to 1 hour, it was thus attempted here to effect a determination of the state of tension by way of the smallest number of exposures.

According to a method of this invention beams of X-ray are directed from all sides onto a focal point or area to be inspected at a fixed angle of incline to the surface of the material to be tested. Thus the X-rays define the uninterrupted surface of a right circular cone; the apex (focus) of the cone is located at the observed point or area of the material to be tested and the axis of the cone extends normally to the surface of the material. This "conical" irradiation may be accompanied by an irradiation in a normal direction by a pencil of X-rays.

The "conical" irradiation may be produced by directing an endless "conical" sheet of X-rays simultaneously in all directions onto the point or area to be observed; or by directing one or more pencils of X-rays from one or more sources of X-rays at the fixed angle of inclination onto the focal point or area, and then revolving said source or sources around an axis extending from the focal point or area normal to the surface to be inspected so that they progressively define the uninterrupted surface of a cone. Of course this rotation may be effected either by revolving the X-ray pencil relatively to the material to be tested or by rotating the camera and the material to be tested.

The reflected or secondary rays of interference may then be intercepted for registering or recording on any X-ray sensitive or responsive means, such as photographic plates or films, photo-electric cells, ionization chambers, impulse or point counters, etc. But preferably I use a hollow camera, and during the time of exposure the camera should remain stationary relatively to the surface observed. The film or X-ray responsive surface or surfaces are arranged concavely or conically above the surface tested, and the conical arrangement may also comprise cylindrical surfaces, which may for instance be arranged in a manner of a step cone.

When the whole "conical" irradiation is applied at once, in a conical sheet so to speak, rotation or revolution of parts is not necessary. Such simultaneous "conical" irradiation may be obtained from one or more X-ray tubes, where the cathodes and the anti-cathode are arranged annually, and where the rays are converged at any desired azimuth by way of an annular lens or lenses upon a common focus, i. e. the point or area to be observed on the material to be tested.

By way of such a method or apparatus a definitely limited area or point of the material to be tested may be irradiated or scanned by X-rays, and this is extremely important for the investigation of properties which may quickly change locally, e. g. concerning the state of tension, or on account of a difference and concentration of mixed crystals, etc. but likewise this method with a single exposure may be carried out in a much shorter time than tests made heretofore, because a very high intensity of irradiation is obtained by the convergence of the rays to a single point or limited area of focus.

The diagrams or photographs obtained by my method just described, or by the apparatus indicated, or both may be interpreted as follows: The position of the principal direction of tension in an observed area of the surface of the material to be tested may readily be determined —without any complicated calculation—from the manner in which two delimiting curves extend. The magnitude of the two principal forces acting in the surface or plane observed can be determined from the largest and smallest diameter of the delimiting curve; similarly any desired component of force or tension in the surface or plane observed may be quantitatively determined. Thus the complete state of tension in a predetermined small area—point or focus—of the surface or an underlying plane may be established in relation to any arbitrary starting point. For a conic film in the conic camera the mode of calculation of the principal forces is determined as follows:

The position of the principal forces may be determined directly from the eccentricity of two delimiting curves registered upon a conically disposed film $11$. The amount of each principal force may be calculated from the diameters and angles relating to the delimiting curves according to the following formulae:

$$\sigma_1 = \frac{(r_1'-r_3')_1 - (r_1-r_3)}{(r_1-r_3)\ 2\ \cotg\frac{\vartheta}{2} B \frac{1+\nu}{E}}$$

$$\sigma_2 = \frac{(r_1'-r_3')_2 - (r_1-r_3)}{(r_1-r_3)\ 2\ \cotg\frac{\vartheta}{2} B \frac{1+\nu}{E}}$$

The key for these formulae is:

$\sigma_1$ and $\sigma_2$ are the two principal forces in the plane of the surface.

$(r_1'-r_3')_1$ and $(r_1'-r_3')_2$ are the respective distances between the delimiting curves measured in each instance in the azimuth of the respective delimiting force.

$$(r_1-r_3) = \frac{h\ \sin \omega\ \sin \phi}{\sin(\omega_0+\vartheta+\phi)\ \sin(\omega_0+\vartheta)}$$

$\omega_0$ is the angle formed by the conic film with the vertical.

$h$ is the height of the conic camera.

$\frac{\vartheta}{2}$ is the angle of deflection, e. g. 9.5° for mild steel when cobalt cathode rays are used.

B is the coefficient $tg\left(\omega_0'+\frac{\vartheta}{2}\right)=\sin 2\ (\omega_0'+\vartheta)$ $\omega_0'$ is the value of $\omega_0$ belonging to a maximum B.

$\nu$ is the Poisson's ratio, which is 0.28 for mild steel.

E is the modulus of elasticity, which may be taken at 20,850 kg./mm.$^2$ for mild steel.

$\phi$ stands in each formula for the azimuth angle formed in clock-wise direction between the respective principal force ($\sigma_1$ or $\sigma_2$) and the axis of the ordinates.

Various details herein referred to are exemplarily and in some instances diametrically illustrated in the accompanying drawings, in which Fig. 1 is a vertical cross-section of an X-ray tube and camera adapted for simultaneous "conical" irradiation.

Fig. 2 shows, in a similar view, a detail of a modified X-ray tube, which embodies a vertical X-ray pencil in addition to "conical" irradiation.

Fig. 3 shows a partly schematic elevational view of an arrangement of devices, where an X-ray pencil is to be moved relatively to the material to be tested.

Figs. 4–9 show different diagrams for determining and exploiting the principal forces.

Similar numerals refer to similar parts throughout the various views:

Figure 9:
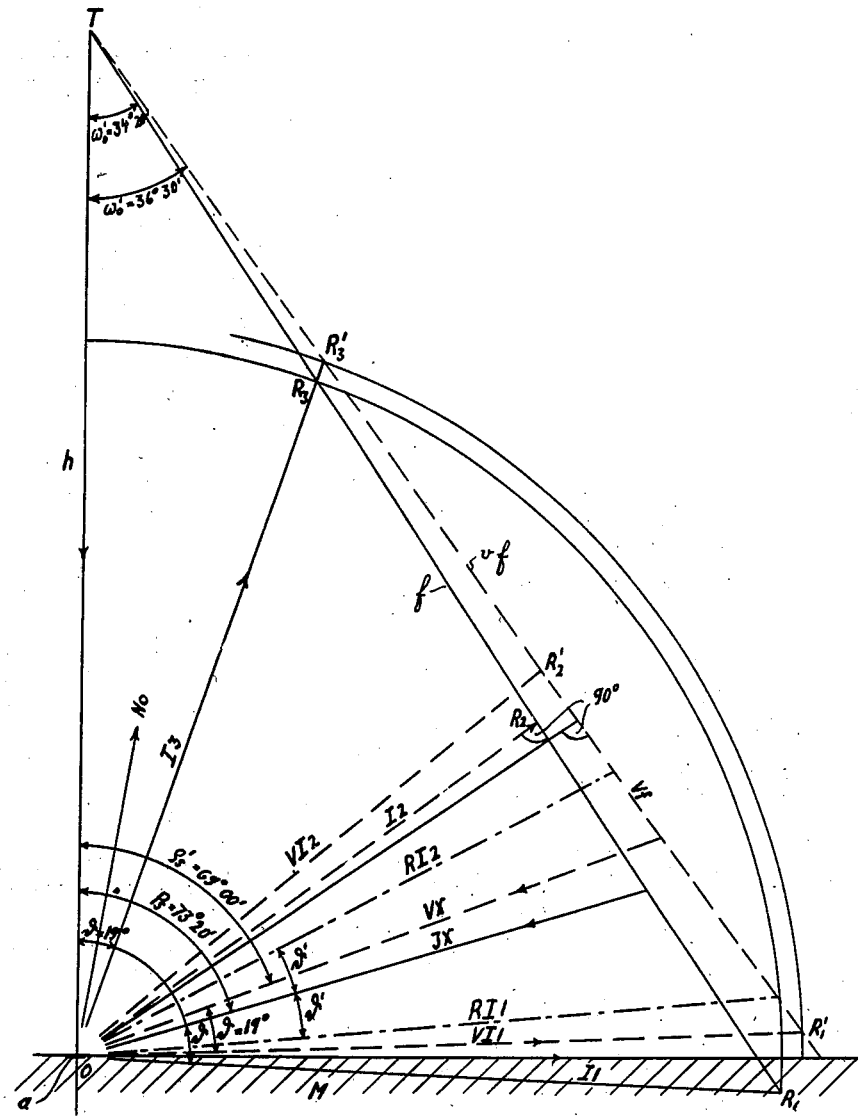

An annular glow cathode 2 is arranged in an X-ray tube 1 concentric and opposite to annular anti-cathode 3. The enclosure 5 of the envelope of the X-ray tube may be executed in metal in which case the anti-cathode 3 may form part of said enclosure 5. According to X-ray practice the envelope may be highly evacuated. The enclosure 5 may comprise a cooling chamber 24, through which a cooling fluid may be passed by way of the inlet and outlet 4. A conical section 6 of said cooling chamber 24 may extend up into the X-ray tube, thus providing a conical recess in the bottom of the tube. The double wall of the conical section 6 may be provided with registering endless windows 7, which are suited for the passage of X-rays issuing from the anti-cathode 3. A pair of concentric conical sheets 8 serve as a lens conducting the radiated X-ray through windows 7 and a film 11 onto a focal area or point 12 of the material 9 to be tested. Photo-sensitive material, e. g. film 11 is mounted upon the innermost conical surface of the section 6, which faces the outside of the X-ray tube, so that it intercepts the rays of interference reflected at the focal point 12. The glow cathode 2 may be mounted in the X-ray tube by a support, which serves at the same time to connect it to a suitable source of current. Or, as exemplarily shown in the drawings, the connector 16, which is mounted upon the envelope of the X-ray tube but suitably insulated relatively to the enclosure 5, may provide a high negative potential for the glow cathode 2 by way of wiring 25. Wiring 25 is accommodated in an insulated system comprising the central tube 13 and branch tubes 14, 15, these tubes being preferably fixedly allocated in the envelope by way of brackets 26 and 27. Annulus 17, which closes the cooling chamber 24 relatively to the interior of the X-ray tube and carries the anti-cathode 3, is connected to the positive terminal of the high tension supply and is preferably grounded at 18. In order to facilitate an exchange of the anti-cathode—for substituting an anti-cathode at different angle for instance—the X-ray tube may be executed in sections, which may be taken apart, and in that case a connector 19 for connection with a vacuum manifold may be provided for.

The conical camera recess serving to receive a conically disposed film 11 may also be shaped to accommodate films or light sensitive means of different shape, e. g. the steps of cylindrical film 28 of Fig. 3. The glow cathode may be replaced by a cathode adapted for ionic actuation. Or the annular anti-cathode 3 may be irradiated by a cathode, say pencil, which is directed centrally down in the tube, but which is magnetically redirected onto the annular anti-cathode, by way of a moving electro-magnetic field for instance.

If a central X-ray pencil is to be provided for, in addition to "conical" irradiation, the junction point of tubes 13, 14 and 15 and the apex of the double walls of the conical section 6 may be reorganized, whereas all other parts of an X-ray tube of Fig. 1 may remain the same. A detail of the reorganized parts is shown in Fig. 2. A glow cathode 20 depends below the tube 13, and registers with the anti-cathode 21, which is connected, by way of a suitable cooling manifold extension 29 with the positive terminal of a high tension source of current, e. g. to section 6 of metal chamber 24. By way of suitable windows 22 and lens 23 the central X-ray pencil emanating from the anti-cathode 21 is then trained upon the focal area 12 below. The cooling chamber 24 may be suitably partitioned in order to provide for the proper conduction of the cooling fluid to and away from anti-cathode 21, as taught by the prior art.

The additional central X-ray pencil normally striking the focal area 12 from the anti-cathode 21 may serve for the purpose of establishing a delimiting curve in addition to a curve of that nature provided by the "conical" radiation discussed before.

When a device of Fig. 1 is used, and we do not have at our disposal the central X-ray pencil which is obtained by way of a device of Fig. 2, then a second delimiting curve (circle) may be produced by the "conical" radiation by way of interference on a test body, e. g. a gold foil or a film of powder of gold 44, mounted, e. g. applied with a hair brush upon the surface of the material to be tested.

When standard X-ray tubes are to be used instead of the special embodiments of Figs. 1 or 2 for carrying out the methods of the instant invention one or more standard X-ray tubes are revolved about an axis normal to the surface of the material to be tested, the primary X-ray pencil passing successively through all azimuths; but the film remains stationary relatively to the material to be tested. This embodiment of the invention may, of course, be also carried out in connection with one or more stationary X-ray tubes, by rotating the material to be tested together with the camera, as illustrated in Fig. 3. A piece of material 9 to be tested is deposited upon the turntable 31. Turntable 31, and a motor 32 slowly rotating said turntable by way of a worm drive 33, are mounted upon a vertical slide 34. The slide 34 is accommodated upon the riser 36 and may be vertically adjusted thereupon by a feed screw and wheel 35.

By way of vertical adjustment of turntable 31 the surface 37 of material 9 may be placed into the focal range of X-ray pencil 38 of X-ray tube 39, i. e. into alignment with or slightly above the crossing point of said pencil 38 the axis of rotation of the turntable at which a normal and central pencil 40 of a second X-ray tube 41 may also be arranged to play. By way of a bracket 42 supporting X-ray tube 39 the latter may be adjusted in an arc upon a circular extension 43 extending up from riser 36. One or more cylindrical film sections 28 may preferably be centralized upon the surface 37 of the material 9, e. g. in step cone fashion. Upon rotation of the properly adjusted turntable 31 the X-ray pencil 38 will establish a conical sheet of irradiation having an apex upon a focal area upon the surface 37 of material 9, in accordance with the principal feature of this invention.

The circular extension 43 may be graduated, as shown, one or more of the spaces marked on by the scale corresponding for instance to the thickness of the "conical" sheet of X-rays produced by X-ray pencil 38. With the help of the graduation of the circular extension 43 we may therefore shift the X-ray tube 39 for the distance corresponding to the thickness of the X-ray pencil 38. If such shifting is brought about time and time again during the operation of the apparatus, e. g. after each revolution of the turntable 31, the X-ray pencil 38 will scan a space many times the thickness of the conical sheet first circumstribed. The focal point on the material to be tested will therefore be irradiated by X-ray filling a solid cone subtended by a zone, the width of the zone corresponding to the thickness of the pencil 38 multiplied by the number of times the X-ray tube 39 has been shifted along the circular extension 43. By irradiating an area of the material to be tested in the manner just described, we obtain another photograph defining the crystal lattice of the material tested. By continuing to shift the X-ray tube 39 along the circular extension 43, until the subtending zone becomes a segment, we can irradiate the area to be tested throughout a solid cone of irradiation, which yields another type of photograph for the interpretation of the crystal lattice.

Using a central X-ray pencil on one hand, and an X-ray cone, on the other hand, the following procedure, may, for example, be used, such procedure being better understood by way of Figs. 4 to 9 of the accompanying drawings:

The force $\sigma_3$ which is the one of the three principal tensile forces disposed in a direction normal to the surface, may be assumed to be equal to zero for practical purposes. The other two principal forces $\sigma_1$ and $\sigma_2$ lie in a plane tangential to the material to be tested at the focal point observed upon the surface of the material. Under these circumstances the ellipsoid of forces is reduced to an ellipse. The long and the short axis of the ellipse are disposed in such fashion in respect to a rectangular system of coördinates located in said plane, that the zero point of said system registers with the focal point on the surface of the material to be tested at which converge the X-ray cone and the central X-ray pencil. The principal force $\sigma_1$ forms—according to Fig. 4—with the Y-axis in clockwise direction the azimuth angle $\Phi$. The Z-axis of a system of coördinates extends from said focal point normal to said tangential plane, the Y-axis is disposed in a direction chosen at random for the purpose of reference in said tangential plane. Expansion of the material to be tested takes place in a direction OP which direction is expressed by the polar coördinates $\rho$ and $\phi$, and is to be measured by way of the changes of distance between a number of parallel lattice planes, the normals of these planes being disposed in respect to the system of coördinates in the direction of OP. It must be assumed, that the irradiated area of the surface of the material to be tested is so small, that the state of tension within said area may be presumed to be homogeneous, i. e. the lattice planes remain parallel and even within said area during deformation. Assuming further that the material to be tested is of a quasi-isotropic condition, the following formula for the relative change of distances between a number of lattice planes in the direction $\rho,\phi$ of their normal may be derived under the laws of physics governing crystals:

$$\epsilon(\rho,\phi) = \frac{d'-d}{d} = \frac{\Delta d}{d} = -\frac{\nu}{E} \cdot 2\sigma_0 + \frac{1+\nu}{E} \sin^2\rho[\sigma_0 + \tau_0 \cos 2(\Phi-\phi)]$$

In that formula $d$ is the distance between the lattice planes in an undeformed state, whereas $d'$ is that distance in an elastically deformed state of the material to be tested; E is the modulus of elasticity of the isotropic body; $\nu$ is the Poisson ratio, G is the modulus of transverse elasticity (due to the relation $$\frac{1+\nu}{E} = \frac{1}{2G}$$

the quantities $$\sigma_0 = \frac{\sigma_1 + \sigma_2}{2}$$

and $$\tau_0 = \frac{\sigma_1 - \sigma_2}{2}$$

represent the average pressure and net propelling force exerted at the point observed on the material to be tested, respectively.

Fig. 5 is a stereographic projection of a polar sphere imaginarily extended over the axes of the coördinates at the observed point, which point serves as the center. The diagram illustrates, how the roentgenographic determination of expansion may be carried out. Let us assume that the monochromatic primary pencil OS is incident at a polar distance from $\rho_s$ from the Z-axis and at an azimuth $\phi_s$ in respect to the Y-axis. The normals of all lattice planes which reflect at an angle $$\alpha = 90° - \frac{\vartheta}{2}$$

must be located upon a conical surface surrounding OS and having an opening angle $\vartheta=180°-2\alpha$. In its stereographic projection this cone is represented by a small circle around the pole of S, and all poles of reflecting lattice planes must be located on this circle; the rays issuing from the material by way of reflection, i. e. the rays of interference, are on their part located on a cone of interference, which has an angular opening $2\vartheta$, and are therefore located in their projection R upon a corresponding small circle at S. If the plane of incidence at point S forms in clockwise direction the angle $\psi$ with an imaginary plane through Z and S, the polar coördinates $\rho_P$, $\phi_P$, $\rho_R$, $\phi_R$ of the pole of the respective lattice plane and of the ray of interference are obtained from the formulae:

$$\cos \rho_P = \cos \rho_s \cdot \cos \frac{\vartheta}{2} + \sin \rho_s \cdot \sin \frac{\vartheta}{2} \cdot \cos \psi;$$

$$\sin (\phi_P - \phi_s) = \sin \frac{\vartheta}{2} \cdot \frac{\sin \psi}{\sin \rho_P}$$

$$\cos \phi_R = \cos \phi_s \cdot \cos \vartheta + \sin \phi_s \cdot \sin \vartheta \cdot \cos \psi;$$

$$\sin (\phi_R - \phi_s) = \sin \vartheta \cdot \frac{\sin \psi}{\sin \rho_R}$$

Therefore the position of R or P does not only depend from $\vartheta$ and $\rho_s$, but also from the meridional angle $\psi$. In order to determine the location of the direction of the principal forces, let us first consider the factor $$F(\Phi - \phi_s) = \sigma_0 + \tau_0 \cos 2(\Phi - \phi_s)$$

which varies with the azimuth angle $\Phi - \phi_s$ of the primary ray relatively to the azimuth of the direction of one of the principal forces. This factor becomes equal to $\sigma_1$, when the primary ray $\phi_s = \Phi$ or $180° + \Phi$ is disposed in a meridial plane extended through $\sigma_1$ and Z. It becomes equal to $\sigma_2$, when the primary ray $\phi_2$ is disposed in the meridial plane $\phi_s = \Phi + 90°$ or $\Phi + 270°$ passing through $\sigma_2$ and Z. It has the mean value $$\sigma_0 = \frac{\sigma_1 + \sigma_2}{2}$$

for instance, corresponding to the average pressure in the symmetrical azimuth directions $$\Phi = \phi_s = 45°, 135°, 225°, \text{ and } 315°$$

(Fig. 6). If we therefore change the azimuth of the primary rays continuously, so that it assumes all values between zero and 360°, then the pencil of primary rays will also pass through the location of the meridians of $\sigma_1$ and $\sigma_2$. The respective values of expansion $\Sigma_1$ and $\Sigma_2$ are extreme values; and therefore the corresponding radii of the Debye-Scherrer-rings must also assume extreme values.

Thus an arrangement is to be made, in accordance with which a point O with its environment is focussed consecutively or continuously by the sharply defined monochromatic pencil of primary rays in a direction normal to the surface of the specimen to be tested, as well as by a second pencil of primary rays at an incline to the surface of an angle $\sigma_s$ which is for the time being left undetermined. By way of rotation of the X-ray-tube around an axis arising normal to the surface of the specimen from O the latter ray then sweeps consecutively through all possible azimuths. Or by suitable construction an X-ray tube is executed right from the start in such fashion, that a concentric, conically disposed sheet of rays is simultaneously incident to the surface of the specimen at the point O observed at the incline of angle $\rho_2$. The direction of OS should be chosen, so that the rays of interference are as normal as possible and again as tangential as possible to the surface, from which they issue; furthermore angle $\vartheta$ should be as small as possible, in order to yield high accuracy of the measurements. The rays of interference, which diverge strongly in space, should be rendered simultaneously photographically effective and Fig. 7 shows a suitable, conically shaped film. This film is arranged upon the interior of a conically disposed camera of the Regler type having an apex at T, having an axis disposed normal to the surface of the specimen to be tested, and having an angular opening $2\omega_0$. A ray of interference issuing from the surface of the specimen to be tested at an angle $\rho_R$ will strike the conical film surface at the point R, which has in respect to the cone the coördinates $r$, which is measured from the apex T of the cone, and $\Phi_R$, which is the azimuth measured from a predetermined reference meridian. The relationship between these coördinates of the cone or the linear variation $\Delta\chi$ of distance of the film, and the elastic variation $\Delta\frac{d}{d}$ of lattice plane distances of the material to be tested during deformation within the elastic range may be expressed as follows:

$$\Delta\tau = \frac{h \sin \omega_0}{\sin^2(\omega_0+\rho_R)} \cdot Q.2 \cot g \frac{\vartheta}{2} \cdot$$

$$\int \left[ -\frac{\nu}{E} \cdot 2\sigma_0 + \frac{1+\nu}{E} \cdot \sin^2 \rho . F.(\Phi-\phi_s) \right]$$

In this formula $\omega_0$, $\rho_R$, $\vartheta$, $\sigma_0$, $\tau_0$, and F have been defined above. Q is an abbreviation for $\cos \rho_s \sin \chi - \cos\rho \cos\chi$. $h$ is the height of the camera cone, and X stands for $\rho_R - \rho_s$. Consequently, and as it was also apparent from the formula for $\rho_R$, $\Delta\tau$ depends on the meridian angle $\psi$, as well as from $\omega_0$, $\rho_R$, $\vartheta$, $\Phi-\phi_s$ and $\rho_s$. The factor Q attains the maximum value of 1 for the pairs of values of $\psi=0$, $\chi=180°$, and $\chi=0$, $\psi=180°$, i. e. the ray of interference is in this case disposed in the meridian of the primary ray and—seen from S—it is turned away in the case 1 (from, and in case 2) toward the Z axis (Fig. 6). When the azimuth of the primary rays is continuously changed, all cones of interference of the same number of lattice planes, which belong to a primary ray incident under the angle $\rho_s$, are superimposed upon each other and enveloped by two "delimiting curves" DC1 and DC2, which correspond to the following parameters:

(1) $\rho_1 = \rho_s + \frac{\vartheta}{2}, \rho_{R_1}=\rho_s+\vartheta_1 \phi_1=180°+\phi_s, \psi_1=180°, \chi_1=0$ (2) $\rho_2 = \rho_s - \frac{\vartheta}{2}, \rho_{R_2}=\rho_s-\vartheta_1. \phi_2=\phi_s=\psi_2=0, \chi_2=180°$ The same result is obtained when the concentric sheet of rays is incident to the surface at an angle of $90°-\rho_s$. In the case where the direction of the primary ray is normal to the surface of the material to be tested, i. e. the angle $\rho_s=90°$, the two delimiting curves coincide with the corresponding cone of interference, yielding the delimiting curve DC3 of Fig. 8, where $\rho_s=\vartheta$. In the case of an undisturbed lattice the delimiting curves, being sections of co-axially rotated cones, are circles upon the conical surface of the film and also represent circles when the conical film is developed in a plane. Here $r$ is a constant, and so is the circular section $\rho_R$, i. e. $\rho_{R1}=\rho_s+\vartheta$, $\rho_{R2}=\rho_R-\vartheta$, $\rho_{R3}=\vartheta$. When the lattice parts are elastically distorted, they will deviate the more, however, from a circle, the greater the deformation or the more pronounced the ellipsoid of deformation in the observed surface of the material to be tested. This behavior may be represented quantitatively by the formula:

$$\frac{r_1'-r_3'}{r_1-r_3}=1+2 \cot g \frac{\vartheta}{2} \left[ 2\sigma_0 \cdot \frac{\nu}{E} \cdot A + 1 + \frac{\nu}{E} \cdot B.F.(\Phi-\phi t) \right]$$

$$A = \frac{\sin (2\omega_0+2\vartheta+\rho_s)}{\sin (\omega_0+\vartheta+\rho_s).\sin (\omega_0+\vartheta)}$$

$$B = \frac{\sin \rho_s.\sin^2\left(\omega_0+\frac{\vartheta}{2}\right)}{\sin (\omega_0+\vartheta+\rho_s).\sin (\omega_0+\vartheta)}$$

$$F = \sigma_0 + \tau_0.\cos 2.(\Phi-\phi_s)$$

This corresponds to a comparison of the two delimiting curves DC1 and DC3, which are farthest apart and in connection with which the rays of interference issue almost parallel and normal to the surface of the material to be tested, respectively. The quantity $r_1'-r_3'$ may be measured directly in the film; the difference $r_1-r_3$ which appears in the denominator may be taken without hesitation from the following formula with the approximate value of $\vartheta$:

$$r_1-r_3 = R \cdot \frac{\sin \omega_0.\sin \rho}{\sin (\omega_0+\vartheta+\rho_s) \sin (\omega_0+\vartheta)}$$

By a suitable choice of $\rho_s$ the coefficient A of the item, which contains the average pressure, may be caused to disappear; this happens in the simple case where $$\rho_s = 180° - 2(\omega_0+\vartheta)$$

Therefore the two issuing rays of interference are similarly inclined relatively to the cone of the film, which is of advantage for accurate measurements and for a sharp definition of the picture. Furthermore the coefficient B of the element containing F may be rendered a relative maximum concerning a predetermined angle of reflection $\vartheta$. This has the advantage, that location and size of the principal forces trend towards a maximum concerning the variation of distances $r_1'-r_3'$ and a best possible accuracy of measurement is obtained. When there is a predetermined number of lattice planes and an angle of the rays of interference is determined thereby under the Bragg formula in connection with a known wave length $\lambda$ and a known lattice constant, we obtain a maximum value for B from the relationship $$\Psi\left(\omega_0'+\frac{\vartheta}{2}\right)=\sin 2(\omega_0'+\vartheta)$$

where $\omega_0'$ is the value of $\omega_0$ belonging to a maximum B. Thus the angle of the opening of the conical camera should be selected in a predetermined manner. When, by way of example $$\frac{\vartheta}{2}=9.5°$$

corresponding to the interference of (.013) in $\alpha$—iron under cobalt—or $Co_\alpha$ irradiation, we have the following system of values:

$$\omega_0' = 34°20'$$
$$\omega_0'+\vartheta=53°20'$$
$$B \max = 0{,}715$$
$$\rho_s = 73°20'$$

The path of the rays in this case illustrated in Fig. 9. The ray corresponding to the lower delimiting curve DC1 is absorbed in the material to be tested, because $\rho_s+\vartheta=73°20'+19°=92°20'$. Therefore it is advisable to effect a variation to a slightly smaller angle, e. g. $\rho_s=69°$, $\omega_0=35°30'$. This is permissible on account of the flat maximum of B.

Using the foregoing extreme values for the angle of an opening of the camera and for the angle of incidence we obtain, in connection with the said example, the following variation of distances in the film, measured in millimeters:

$$r_1' - r_3' = 84.6[1 + 0.487 \times 10^{-3}(\sigma_0 + \tau_0 \cos 2 \cdot (\Phi - \rho s))]$$

Assuming that the principal forces have the values $\sigma_1 = 20$ kg./mm.$^2$ and $\sigma_2 = 10$ kg./mm.$^2$ we obtain the following changes of distances of the azimuths, which correspond to the direction of the principal forces of tension or expansion, in connection with mild steel having a modulus of elasticity E=20,850 kg./mm.$^2$, a Poisson ratio of $\nu$=0.28, a modulus of transverse elasticity G=8150 kg./mm.$^2$, or ½ g.=0.613×10$^{-4}$, $$\frac{\vartheta}{2} = 9.5°$$

and a height of 100 mm. of the cone:

$(r_1' - r_3') \sigma_2 = (81.9 + 0.645)$ mm.
$(r_1' - r_3') \sigma_1 = (81.9 + 1.29)$ mm.

These deviations from a circular extent of the delimiting curves should be discernible by the mere eye without taking actually measurements. Of course they will become more prominent, if the principal forces are larger and the more the principal forces differ from each other. This is particularly the case, when one of the principal forces represents tension and the other one compression. Furthermore the difference $r_1' - r_3'$ becomes larger when the angle $\vartheta$ decreases and in the case of a smaller isotropic modulus of transverse elasticity, e. g. in connection with light metal.

Thus we may readily evaluate the principal forces from the corresponding diameters of the delimiting curves according to the formulae given hereinabove in the first instance; and by way of the instant method the location or direction of the forces may be directly recognized from the eccentricity of two delimiting curves on the conical film. This does not only represent scientific advancement, but also a technological progress, more particularly in consideration of the cumbersome set-up of the measuring apparatus and the complicated calculations necessary in the old art.

It has been mentioned above, that the delimiting curves projected in the case of an undisturbed lattice appear as circles upon the conical film surface and also when such film has been developed in a plane. By way of modification another, third delimiting curve may be used in place of the delimiting curve DC3,—which was produced by a special, normal primary ray disposed substantially in the axis of the conical film and which represents a section of the interference cone circumscribed by the delimiting sheet of interference rays reflected by the crystal lattice planes,—with the cone of the film. Such an alternative delimiting curve is obtained by another conical sheet of interference rays. These other rays are a reflection of the primary sheet of rays—which is concentrically incident at an incline as illustrated in Fig. 9—produced by a thin layer of a reference metal, like gold affixed at the focal point O upon the material to be tested. The other cone of interference rays thus produced is of course different from that produced by the material to be tested. The respective delimiting rays RI1 and RI2 define a delimiting curve serving as a reference for the measurement of the delimiting curve produced by changes of tension in the material to be tested. See Fig. 9.

In Fig. 9 solid straight lines are used for the surface of the material to be tested, for a line extending normal thereto from the focal point O, for the normal of the reflecting lattice plane, for the delimiting rays of interference and for the film cone $f$ comprising points R1, R2 and R3 at an exact maximum of B. In Fig. 9 dash lines represent incident and interference rays and the film cone at a slight variation, which is brought about in order to shift the delimiting ray I1 into a position VI1 just above the surface of the material M to be tested. Here the film cone v. f. comprises the points R1' R2' and R3'.

In the same figure the dot-dash lines denote the reference interference rays produced by a reference metal, e. g. gold, superimposed upon the surface of the material M to be tested. These reference rays serve as a reference for the other interference rays, when said other interference rays assume a different location under varying tensions in the material to be tested.

The distance R1 R3 changes with the azimuth, and represents a measure for the location and size of the two principal forces occurring in the surface of the material to be tested.

Having further reference to Fig. 9, except where particular reference is had to other figures, the reference characters are explained as follows:

IC—Interference cone (Fig. 4).
NC—Normal cone (Fig. 4).
DC—Delimiting curves (Fig. 8).
O—Focal point in Figs. 4, 6, 7, and 9 and identical with the point 12 of Figs. 1 and 2.
$h$—Height of the film cone and axis of the normal ray (Figs. 5 and 9).
JX—Incident X-rays or sheets of X-rays at an exact maximum of B.
VX—Same, slightly varied.
I—Delimiting rays of interference, as reflected by the material to be tested.
VI—Same, slightly varied.
RI—Reference rays of interference as reflected by a reference metal like gold.
No—Normal to the reflecting lattice plane.
$f$—Film cone at an exact maximum of B.
V$f$—Same, slightly varied.
M—Material to be tested.
$a$—Area to be tested.
T—Apex of film cone.

The method disclosed herein for measuring crystal structure and tension may also be applied for evaluation of a three dimensional state of forces in the interior of a material to be tested, up to a limited depth below the surface of said material. For this purpose the "conical" sheet of X-ray is focussed upon underlying levels of material, and reasonable deductions may be drawn concerning the extent of the third principal force or the tensions at various levels of the material to be tested.

Having thus described my invention in detail, yet I do not wish to be limited thereby, except as the state of the art and the appended claims may require, for it is obvious that various modifications and changes may be made in the method and form of embodiment of my invention, without departing from the spirit and scope thereof.

What I claim is:

1. A method of producing a record indicative of the structure of and the stresses in a material to be tested, comprising irradiating a limited area on said material from all sides by X-ray beams, so that said beams form the uninterrupted surface of a cone having its apex substantially in said area, and intercepting the secondary beams issuing from the irradiated area by a photo-sensitive means extended over said area, so that said secondary beams produce a record upon said means.

2. A method of producing a record indicative of the structure of and the stresses in a material to be tested, comprising irradiating a limited area on said material from all sides by X-ray beams incident at a predetermined angle to said area, so that said beams form the uninterrupted surface of a right circular cone having its apex substantially in said area, and intercepting the secondary beams issuing from the irradiated area by a photo-sensitive means extended over said area, so that said secondary beams produce a record upon said means.

3. A method of producing a record indicative of the structure of and the stresses in a material to be tested, comprising simultaneously irradiating a limited area on said material from all sides by X-ray beams incident at a predetermined angle to said area, so that said beams form the uninterrupted surface of a right circular cone having its apex substantially in said area, and intercepting the secondary beams issuing from the irradiated area by a photo-sensitive means extended over said area, so that said secondary beams produce a record upon said means.

4. A method of producing a record indicative of the structure of and the stresses in a material to be tested, comprising progressively irradiating a limited area on said material from all sides by X-ray beams incident at a predetermined angle to said area, so that said beams form the uninterrupted surface of a right circular cone having its apex substantially in said area, and intercepting the secondary beams issuing from the irradiated area by a photo-sensitive means extended over said area, so that said secondary beams produce a record upon said means.

5. A method of producing a record indicative of the structure of and the stresses in a material to be tested, comprising irradiating a limited area on said material from all sides by X-ray beams incident at a predetermined angle to said area, so that said beams form the uninterrupted surface of a right circular cone having its apex substantially in said area, and intercepting the secondary beams issuing from the irradiated area by a camera placed over said area.

6. A method of producing a record indicative of the structure of and the stresses in a material to be tested, comprising irradiating a limited area on said material from all sides by X-ray beams incident at a predetermined angle to said area, so that said beams form the uninterrupted surface of a right circular cone having its apex substantially in said area, and intercepting the secondary beams issuing from the irradiated area by a photo-sensitive means conically arising above said area, so that said secondary beams produce a record upon said means.

7. A method of producing a record indicative of the structure of and the stresses in a material to be tested, comprising irradiating a limited area on said material from all sides by X-ray beams incident at a predetermined angle to said area, so that said beams form the uninterrupted surface of a right circular cone having its apex substantially in said area, and intercepting the secondary beams issuing from the irradiated area by a photo-sensitive means extended over said area, so that said secondary beams produce a record upon said means, said angle of incidence being adjusted for different materials tested in order to yield the greatest possible definition in said record.

8. A method of producing a record indicative of the structure of and the stresses in a material to be tested, comprising irradiating a limited area on said material from all sides by X-ray beams incident at a predetermined angle to said area, so that said beams form the uninterrupted surface of a right circular cone having its apex substantially in said area, and intercepting the secondary beams issuing from the irradiated area by a photo-sensitive means conically arising above said area, so that said secondary beams produce a record upon said means, the conical extent of said photo-sensitive means being adjusted for different materials tested in order to yield the greatest possible definition of the record produced thereon.

9. A method of producing a record indicative of the structure of and the stresses in a material to be tested, comprising depositing on said material a foil of material of known reflection upon said material, irradiating a limited area of said material below said foil from all sides by X-ray beams, so that said beams form the uninterrupted surface of a cone having its apex substantially in said area, and intercepting the secondary beams issuing from the irradiated area by a photo-sensitive means extended over said area, so that said secondary beams produce a record upon said means, the secondary radiation issuing from said foil producing a delimiting curve on the record which curve facilitates interpretation of the said record.

10. A method of producing a record indicative of the structure of and the stresses in a material to be tested, comprising depositing on said material a foil of gold, irradiating a limited area of said material below said foil from all sides by X-ray beams, so that said beams form the uninterrupted surface of a cone having its apex substantially in said area, and intercepting the secondary beams issuing from the irradiated area by a photo-sensitive means extended over said area, so that said secondary beams produce a record upon said means, the secondary radiation issuing from said foil producing a delimiting curve on the record which curve facilitates interpretation of the said record.

11. A method of producing a record indicative of the structure of and the stresses in a material to be tested, comprising irradiating a limited area on said material from all sides by X-ray beams, so that said beams form the uninterrupted surface of a cone having its apex substantially in said area, irradiating said area by an X-ray pencil extending normal to said area, and intercepting the secondary beams issuing from the irradiated area by a photo-sensitive means extended over said area, so that said secondary beams produce a record upon said means, the secondary beams producing patterns on the record which have delimiting curves characteristic of the magnitude and direction of stresses existing in said material within said area.

12. A method of producing a record indicative of the crystalline structure of a material, comprising focussing X-rays issuing substantially as a sheet from points along a line onto a limited area of the surface of the material to be tested, and photographing the radiation secondarily issuing from said area, the delimiting curves of the patterns thus produced on the photograph being characteristic of the direction and magnitude of the stresses in said material at said area.

13. A method of producing a record indicative of the crystalline structure of a material, comprising focussing X-rays issuing from points arranged upon a circle as a conical sheet onto a limited area underlying the surface of the material to be tested, and photographing the radiation secondarily issuing from said area, the delimiting curves of the patterns thus produced on the photograph being characteristic of the direction and magnitude of the stresses in said material at said area.

ERNST SCHIEBOLD.